No. 611,073. Patented Sept. 20, 1898.
A. P. MORROW.
BACK PEDALING BRAKE.
(Application filed July 19, 1897.)
(No Model.) 2 Sheets—Sheet 2.
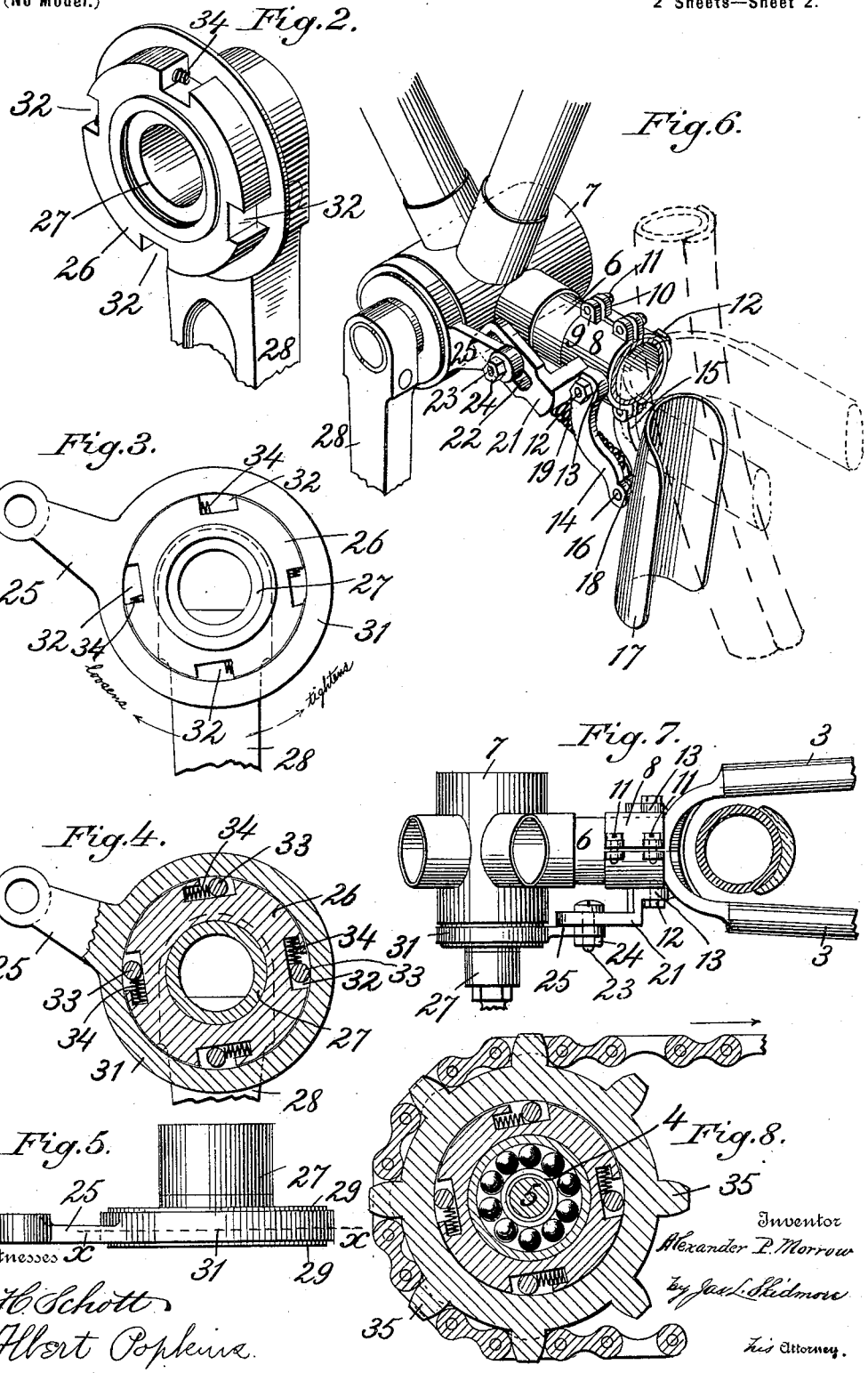

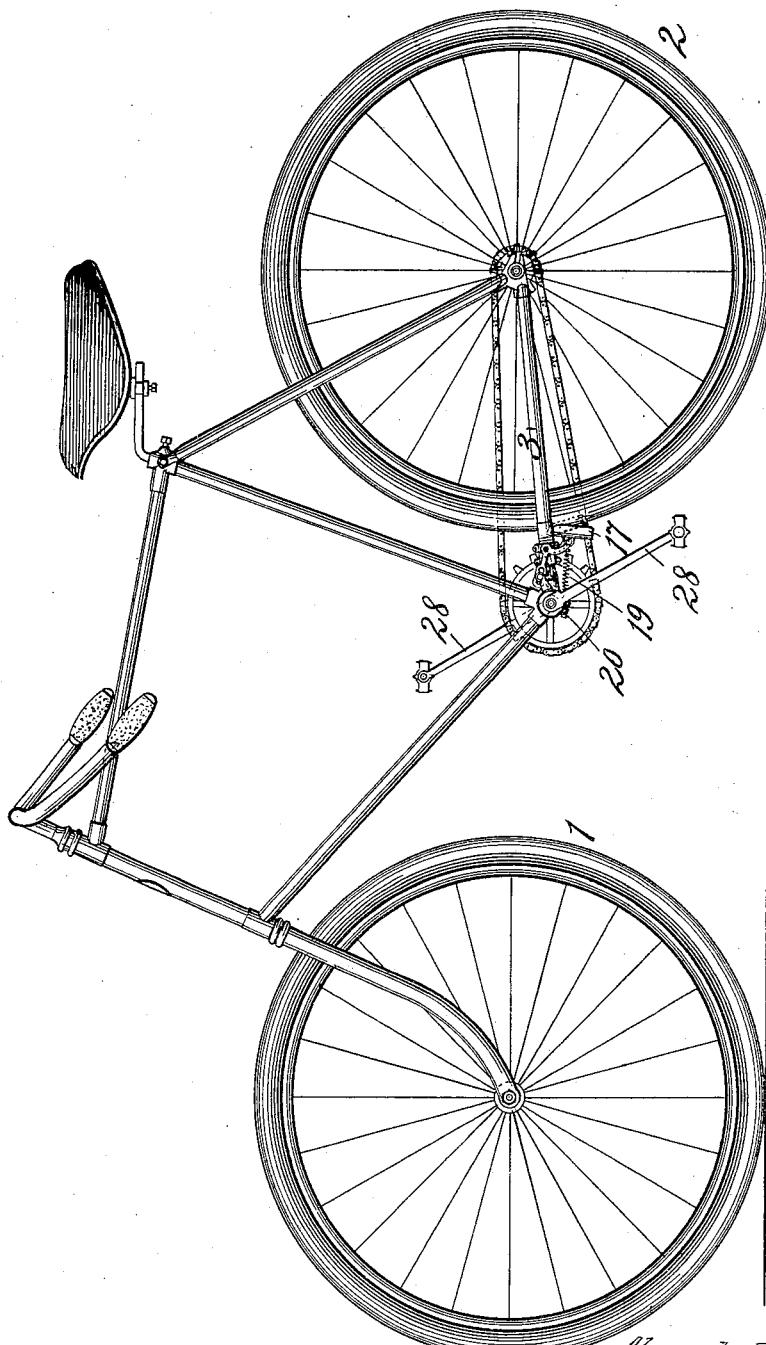

UNITED STATES PATENT OFFICE.

ALEXANDER P. MORROW, OF ELMIRA, NEW YORK, ASSIGNOR OF ONE-HALF TO H. H. FULTON, OF SAME PLACE.

BACK-PEDALING BRAKE.

SPECIFICATION forming part of Letters Patent No. 611,073, dated September 20, 1898.

Application filed July 19, 1897. Serial No. 645,150. (No model.) Patented in England August 3, 1897, No. 18,105.

*To all whom it may concern:*

Be it known that I, ALEXANDER P. MORROW, a citizen of the United States, residing at Elmira, in the county of Chemung and State of New York, have invented certain new and useful Improvements in Bicycle-Brakes and Coasting Mechanism, (for which I have obtained Letters Patent in Great Britain, No. 18,105, bearing date August 3, 1897;) and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to bicycles and like vehicles, and more particularly to means for operating a brake in this class of vehicles by backward movement of the crank-shaft, or "back-pedaling."

The primary object of the invention is to apply a brake to the rear wheel of the machine through mechanism arranged on the driving or crank shaft.

A further object of the invention is to provide a bicycle or like vehicle with brake mechanism operated from the crank-shaft of the machine by back-pedaling and to provide the rear wheel of the machine with shifting devices whereby said wheel may be quickly thrown out of gear with the driving-shaft to permit coasting without revolving the crankshaft.

With these main objects in view the invention consists in the characteristic features hereinafter more fully described, and defined in the appended claims.

The construction illustrated in the accompanying drawings is one embodiment of the invention, which I have found to be satisfactory in operation.

Figure 1 is a side elevation of a bicycle with my improvements applied thereto, the normal position of the brake-shoe and its connections being shown in full lines and the dotted lines indicating the position of the brake-shoe and its connections when the brake is applied. Fig. 2 is a detail perspective view of a part of one of the crank-arms with my improved clutch-disk applied thereto. Fig. 3 is an elevation of the clutch-disk with the clutch-ring provided with a projecting arm applied thereto. Fig. 4 is a vertical section on the line x x of Fig. 5 with the rollers of the clutch in position. Fig. 5 is a top or plan view of the crank-arm and clutch. Fig. 6 is a detail perspective view with parts of the frame of the machine broken away, showing the means for attaching the brake-shoe and its connections to the machine. Fig. 7 is a plan view of the parts shown in Fig. 6, and Fig. 8 is a vertical section through the rear sprocket-wheel and the clutch mechanism arranged therein for permitting coasting without revolving the crank-axle and pedals.

The reference-numerals 1 and 2 respectively indicate the front and rear wheels of the machine. The rear fork 3 of the frame is provided with the usual bearings 4 for the axle 5 of the rear wheel, and the front end of said fork 3 terminates in a forwardly-projecting arm 6, joined to the bearing 7 of the crank-axle.

Upon the arm 6 of the rear fork is secured a split band 8, provided with opposing lugs 9 and 10, secured together by bolts 11, and from opposite sides of this band 8 project lugs 12, which constitute the fulcrum-supports for the upper ends 13 of a pair of levers 14 and 15, arranged one on either side of the arm 6 and connected at their lower ends by a crossbar 16, upon which is pivotally secured the brake-spoon 17 by means of perforated ears 18, projecting from the brake, through which the cross-bar 16 passes.

The brake 17 is connected by a spiral spring 19 with the frame, the forward end of said spring being secured to a screw 20, projecting from the frame, while its rear end is attached to the cross-bar 16.

The lever 14 is provided with a forwardly-projecting arm 21, arranged at an angle to the lever and provided with an elongated slot 22. This arm 21 is connected, by means of a headed bolt 23 and nut 24, with the adjacent end of an arm 25, projecting from the clutch mechanism on the crank-axle, which will now be described.

A disk 26 is rigidly secured upon the hub 27 of the crank-arm 28, and on either side of said disk is secured a ring 29 by any suitable means, said rings being concentrically arranged on the hub 27 with relation to the disk 26 and being of greater diameter than said disk to form an annular seat around the periphery of the disk for the clutch-ring 31. The disk 26 is recessed, preferably at diametrically opposite points 32, to form seats or sockets for transversely-arranged rollers 33. The recesses 32 are deeper at one end than at the other, so that when the rollers are at the deeper ends of the recesses the crank-arm may freely revolve without forcing the rollers into contact with the ring 31. A reverse movement of the crank-arm, however, will move the rollers into the shallower ends of the recesses and cause them to bind tightly against the inner face of the ring 31, thus moving the latter, and through the connection of the arm 25 with the slotted arm 21 of the lever 14 operating the brake.

To facilitate free movement of the rollers within their seats, one wall of each of the recesses 32 is longitudinally recessed to form a seat for a spiral spring 34, against the outer end of which the roller bears.

As shown in Fig. 8, the rear sprocket-wheel 35 of the machine is provided with a clutch mechanism similar to that on the crank-shaft above described, thereby adapting the rear wheel to be disengaged from the driving-chain for coasting purposes.

While the functions of the several parts of the invention will be clear to those skilled in the art from the above description, their operation may be summarized as follows:

Normally the spoon-brake hangs in the position shown in Fig. 1 in full lines—out of contact with the rear wheel. A slight backward movement or stoppage of the driving-chain operates to throw the rear wheel out of engagement with the driving-sprocket through the clutch mechanism carried thereby, thus permitting coasting without revolving the crank-shaft and pedals. The rear wheel of course revolves freely as long as the pedals are revolved in a forward direction; but the instant the movement of the crank-shaft is reversed the rollers move to the shallow ends of the slots in the disk, thus binding the clutch-ring tightly to the disk and causing said ring to turn with the disk. This depresses the arm on the ring, and through the connection of said arm with the arm projecting from the brake-lever 14 the brake is forced against the periphery of the rear wheel, the parts assuming the positions shown by dotted lines in Fig. 1.

Having thus described my invention, what I desire to claim and secure by Letters Patent is—

1. The combination with a cycle, of a pair of levers fulcrumed on the machine-frame in front of the rear wheel, a brake pivotally secured between said levers, an arm projecting from one of said levers and provided with an elongated slot, and a clutch device arranged on the crank-shaft of the machine and provided with a projecting arm secured to the arm which projects from one of the brake-levers, by a pivot-bolt passing through the said elongated slot.

2. The combination with a cycle, of a pair of levers fulcrumed at their lower ends by a cross-bar, an arm 21 projecting from one of said levers, and provided with an elongated slot, a brake pivotally secured upon said cross-bar, a clutch device arranged on the crank-shaft of the machine and provided with a projecting arm pivotally secured to the arm 21, and a spring secured at one end to the machine-frame, and at its other end to said cross-bar.

In testimony whereof I affix my signature in presence of two witnesses.

ALEXANDER P. MORROW.

Witnesses:
SAMUEL S. LANDON,
A. H. GLEASON.